United States Patent [19]

Eickmann

[11] 4,242,775

[45] Jan. 6, 1981

[54] SNAPRING

[76] Inventor: Karl Eickmann, 2420 Isshiki, Hayama-machi, Kanagawa-ken, Japan

[21] Appl. No.: 11,242

[22] Filed: Feb. 12, 1979

[51] Int. Cl.³ .................... B65D 63/00; F16B 19/00
[52] U.S. Cl. ................................. 24/16 R; 24/17 B; 403/326; 411/518
[58] Field of Search ............... 24/16 R, 16 PB, 17 B, 24/17 AP, 206 A; 403/326, DIG. 6; 85/8.8

[56] References Cited

U.S. PATENT DOCUMENTS

| 1,493,089 | 5/1924 | Walker | 85/8.8 |
|---|---|---|---|
| 2,382,945 | 8/1945 | Trafton | 24/16 R |
| 2,491,310 | 12/1949 | Heimann | 85/8.8 |
| 2,886,355 | 5/1959 | Wurzel | 403/326 |
| 2,982,165 | 5/1961 | Wurzel | 85/8.8 |
| 3,132,557 | 5/1964 | Bauer | 85/8.8 |
| 3,162,084 | 12/1964 | Wurzel | 85/8.8 |
| 3,469,494 | 9/1969 | Frailly | 85/8.8 |
| 3,701,303 | 10/1972 | Kondo | 85/8.8 |
| 3,765,065 | 10/1973 | Hay | 85/8.8 |

Primary Examiner—Victor N. Sakran

[57] ABSTRACT

A snap ring consists of four plane rings with a gap for the possibility of radially deforming said rings within the limits of flexibility of the material. Two rings are set as inner rings and two outer rings are set as outer rings axially of the inner rings whereby the rings are axially behind each other fastened relatively to each other around a common axis. However the gaps of the inner rings are showing in another direction than the gaps of the outer rings whereby the outer rings are radially closing the gaps of the inner rings and vice versa. One of the snaprings can be utilized as an outer snapring to hold a cylindrical part therein and another of the snaprings can be an inner snapring for holding itself or a part in a cylinder or bore.

7 Claims, 8 Drawing Figures

SNAPRING

BACKGROUND OF THE INVENTION:

There are snap rings known and widely in use which have relatively to each other substantially eccentric inner and outer faces and a gap for enabling them to be radially deformed in a limited extent and to fasten them onto parts of a slightly smaller or bigger diameter respectively whereafter the difference of the respective face of the snap ring and the part provides, that the snap ring keeps itself on the part or in a groove of the part.

Those known snap rings are however keeping the part only partially enclosed because the gap of the snap ring is open relatively to the to be spanned part.

Therefore the disadvantage of the known snap rings is that they can radially surround only a portion of the respective part whereto the snap ring is fastened and that, when for example the part is itself o deformable materiel like plastic, gum or like or of soft metall, it may deform into the gap of the snap ring whereby an undesired opening might appear.

The common snap ring is therefore for example unsuitable to fasten a plastic hose around a pipe, because fluid in the pipe might escape through said gap.

It is therefore an object of this invention to overcome the disadvantages of the known snap rings.

Another object of the invention is to strengthen the radial fastening capability of the snap ring. A still further object of the invention is to provide a snap ring with an uninterrupted inner face or outer face by setting four snap rings together axially behind each other with two inner and two outer rings whereby the directions of the gaps are differently directed, so, that the inner rings are closing the radial gaps of the outer rings and vice versa.

Further, more detailed objects of the invention are, to provide α snap ring consisting of four substantially equal plane rings, wherein each ring has an inner face and an outer face with an eccentricity between said faces for forming a radially wider portion on the respective ring and a radially narrower portion on the respective ring, wherein said radially wider portion bears the main force of the radial capability to spann said ring in radial direction, wherein a slot is provided cutting said radially narrower portion for making a radial flexibility of said ring possible, wherein an imaginary face can be assumed through the middle of said wider and narrower portions, whereby said ring forms portions of symmetry around said imaginary face;

wherein said slot extends normal or under an angle relatively to said imaginary face, wherein an extension of one arm of said ring extends along said slot to form the other wall of said slot, wherein the other arm of said ring ends on said slot wherein said ring includes at least one connection portion for fastening of a plurality of rings axially behind each other, wherein said four rings consist of two inner rings and of two outer rings, wherein said inner rings are axially behind each other, wherein one of said outer rings attaches one of said inner rings and the other outer ring attaches the other of said inner rings, wherein said inner rings are oppositionally mounted respectively to said outer rings whereby said extensions of said inner rings face said slots of said outer rings, wherein said arm extensions extend radially beyond said slot; and wherein said rings are axially behind each other are kept together by connection means to form together said snap ring, whereby the inner rings are closing the slot areas of said outer rings and said outer rings are closing the slot areas of said inner rings for forming a radially allround inner face set on said snap ring while said snap ring may be radially expanded by pressing said extensions together by a respective pair of forceps for moving said snap ring over a cylindrical part to be fastened whereafter when said extensions are released from said pair of forceps, the said snap ring clamps radially inwardly to keep said part kept allround spanned by said inner faces of said rings under the radially inwardly directed spanning forces of said snap ring, and:

α snap ring consisting of four substantially equal plane rings, wherein each of said rings has an inner face and an outer face with an eccentricity between said faces for forming a radially wider portion on the respective ring and a radially narrower portion on the respective ring, whereby said radially wider portion bears the main force of radial capability to spann said ring in radial direction, wherein a slot is provided, cutting said narrower portion for making for making a radial flexibility of said ring possible, wherein an imaginary face can be assumed through the middles of said wider and narrower portions, whereby said ring forms portions of symmetry around said imaginary face, wherein said slot extends normal or under an angle relatively to said imaginary face, wherein an extension of one arm of said ring extends along said slot to form the other wall of said slot, wherein the other arm of said ring ends on said slot to form the first wall of said slot, wherein said ring includes at least one connection portion for fastening of plural rings axially behind each other around a common axis, wherein said four rings consist of two inner rings and two outer rings, wherein said inner ring are axially behind each other, wherein one of said outer rings attaches one of the inner rings and the other of said outer rings attaches the other of said inner rings, wherein said inner rings are oppositionally mounted respectively to said outer rings whereby said extensions of said inner rings face said slots of said outer rings, wherein said outer faces of said rings can be retracted radially inwardly by narrowing said slots, wherein said outer faces expand radially when the retraction is released, and wherein said outer faces are forming a common allround outer face able to fasten itself under the own radial expansion force within a hollow cylinder whereby the respective portions of the said inner rings are facing the slots of said outer rings and respective portions of said outer rings are facing the slots of said inner rings.

The specifities of the snap rings or of the snap ring assemblies of the invention may be defined in the shortest possible description as follows:

A snap ring of partially symmetric configuration about an imaginatory medial face through centric and an eccentric axes, wherein one radius around one of said axes defines at least a portion of an outer face of said snap ring, wherein another radius around the other of said axes defines at least a portion of an inner face of said snap ring, and wherein a gap slots said snap ring radially while said gap is distanced from said imaginary medial face and set in an angle relatively to said medial face.

In an alternative means are provided on said ring to give hold for a spanner to radially deform said ring against the radial forces of said ring.

The centric inner faces of outer faces of the rings may also be tapered with respect to their axes in order to cut into the bar or hollow body whereon they are set in order to obtain a specially strong capability to hold against thrust in axial direction.

Figure 1:
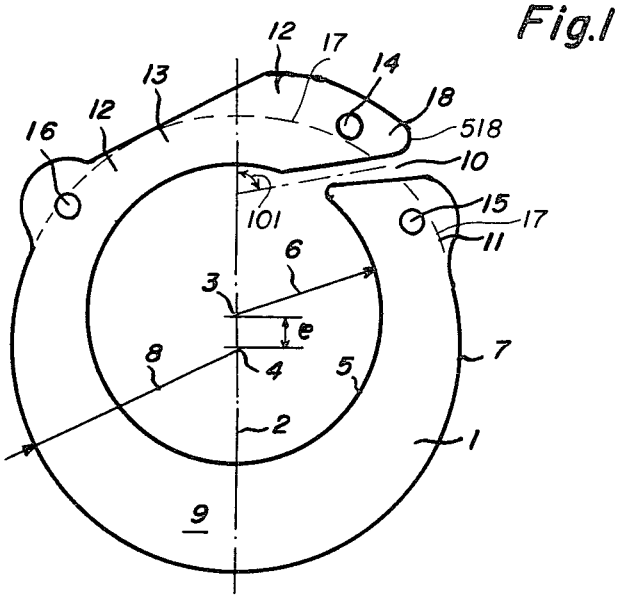
FIG. 1 is a view upon one ring of the invention.

DESCRIPTION OF THE PREFERRED EMBODIMENTS:

The ring shown in FIG. 1 is an outer snap ring, which may also be called the otos ring.

Figure 2:
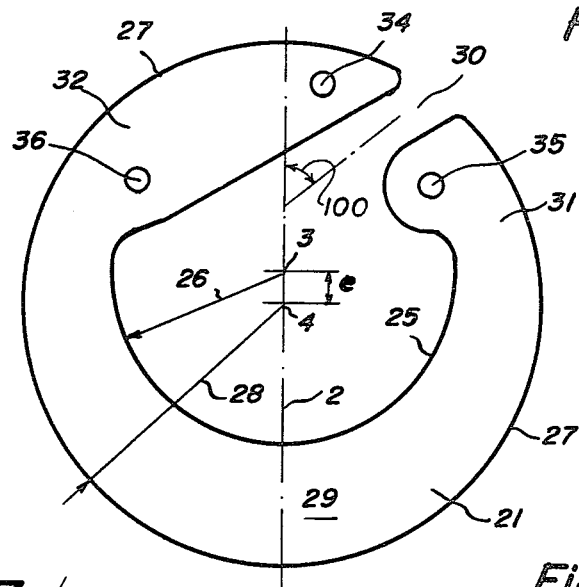
FIG. 2 is a view upon another ring of the invention.

The ring shown in FIG. 2 is an inner snap ring, which may also be called the itos ring.

Figure 3:
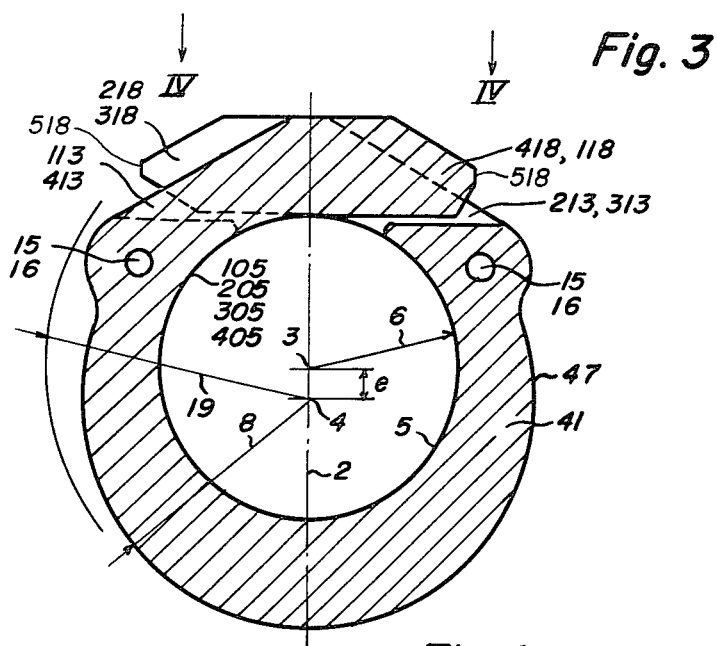
FIG. 3 is a sectional view through a portion of a snap ring of the invention taken along line III—III of FIG. 4.
Figure 4:
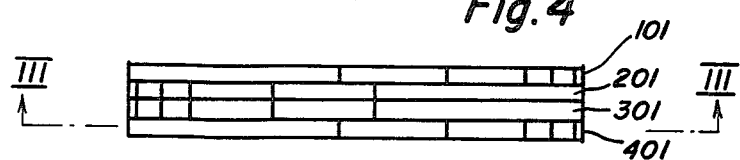
FIG. 4 is a view upon the snap ring of FIG. 3, seen along the arrows IV—IV.

The snap ring of FIGS. 3 and 4 is an assembly of four of the otos rings of FIG. 1 and thereby an outer snap ring or an outer snap ring assembly.

Figure 5:
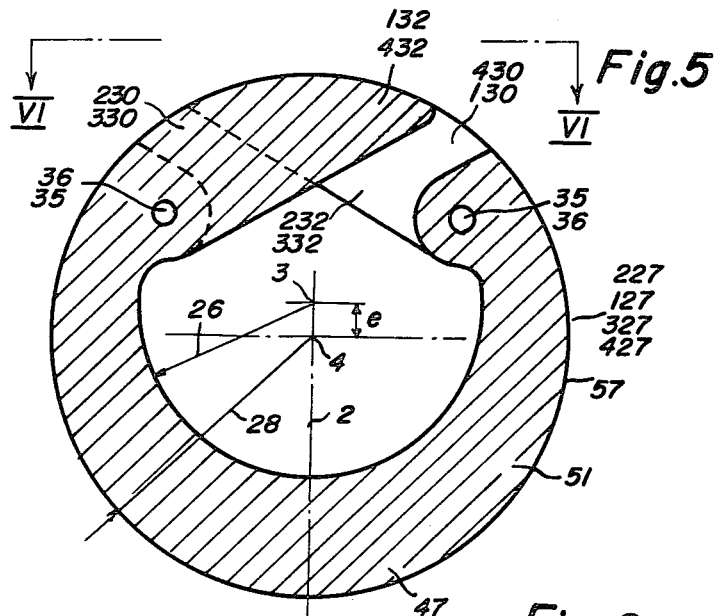
FIG. 5 is a sectional view through a portion of another snap ring of the invention, taken along line V—V of FIG. 6.
Figure 6:
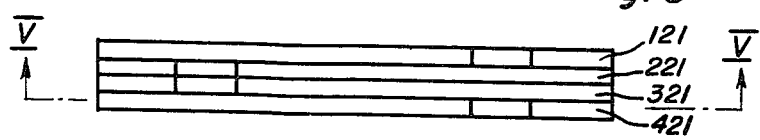
FIG. 6 is a view upon the snap ring of FIG. 5, seen along the arrows VI—VI.

The snap ring of FIGS. 5 and 6 is an assembly of four of the itos rings of FIG. 2 and thereby an inner snap ring or an inner snap ring assembly.

Outer snap rings are provided to be set around a bar or cylinder with a cylindrical outer face. The cylindrical outer face may also be the face of an annullar groove in the bar or cylinder.

Inner snap rings are provided to be set into a hollow body with a cylindrical inner face. The cylindrical inner face may also be a radially extending annullar groove in said hollow body.

Referring now to FIG. 1, there is an imaginary medial face 2 with two centre axes 3 and 4 in said medial face. An inner face 5 is formed on ring 1 by a radius 6 around first axis 3. An outer face 7 is formed partially by a radius 8 around the second centre axis 4. Between centre axes 3 and 4 is an eccentricity "e" provided, whereby the radially wider portion 9 is formed on ring 1. Due to the eccentricity between the radii-axes whereby the inner face and the outer face 5 and 7 are formed, the radial width of ring 1 decreases as more as the outer face is remote from the widest portion at the medial face 2. That gives the ring an ability to deform radially centrically around the first centre 3 by the strength supplied by the radial width at each portion of the ring 1. On the radially narrower portion about opposite of the radially wider portion 9 is a slot or gap 10 provided which radially cuts ring 1 and thereby provides two arms 11 and 12 of ring 1. It is preferred to cut the slot or gap 10 in a direction normal to the medial face 2 or in a direction inclined relatively to the medial face 2. The radius 8 - formed circle is extended by dotted lines 17 also over the arms 11 and 12 to show, that the arm 12 forms an extension 18 which extends beyond the circle formed by radius 8 and beyond a narrowed portion 13. By inserting a tapered key into slot 10 the snap ring cam be radially widened to obtain an inner diameter 5 bigger than that shown in the figure. At such widening the snap ring obtains its radially inwardly directed spanning force. The radial widening may also be done by inserting the fingers of a pentch into bores 14 and 15. When the snap ring 1 is set over a body of a suitable diameter and then the widening is released, the snap ring 1 will clamp itself around the cylindrical outer face of the body and fasten itself there. The ring of FIG. 1 may also have a third bore 16. For facilitating place to set respective bores, the outer face of the ring may be respectively widened radially.

In ring 21 of FIG. 2 the outer face 27 is formed by radius 28 around centre 4 which is in this case the first axis in the medial face 2. The inner face 25 is partially formed by radius 26 around the eccentric centre axis 3. Eccentricity "e" is provided between the axis 3 and 4 to provide a radially wider portion 29 on ring 21 to assure a radial flexibility and contraction of outer face 27 relatively to centre axis 4. Substantially opposite of the wider portion 29 is slot or gap 30 provided in an angle normal to medial face 2 or under an angle to medial face 2 in order to cut ring 21 to enable its arms 31 and 32 to become moved towards each other for contracting ring 21 and its outer face 27. Bores 34 to 36 may be provided and in order to facilitate enough place around the bores the ring 21 may obtain radial inward widenings around the bores. Ring 21 may either be contracted by a Jig surrounding outer face 27 and then be inserted into a hollow body with a suitable cylindrical inner face or ring 21 may be contracted radially by inserting the fingers of a punch into bores 34 and 35. When the contraction is released, the ring 21 will clamp itself on the inner face of hollow body and fasten itself of the cylindrical inner face of the hollow body by its own expansion force.

As known from common snap ring technology the inner diameter of an outside snap ring must be slightly smaller than the diameter of the cylindrical outer face of the body whereon the snap ring shall fasten itself. Accordingly the outer diameter of the outer face of an inside snap ring must be slightly bigger than the inner diameter of the cylindrical inner face whereon the snap ring shall fasten itself.

The outer snap ring or snap ring assembly 41 of FIGS. 3 and 4 consists of four snap rings 101,201,301 and 401 of FIG. 1. Rings 101 and 401 form outer rings wherebetween the inner rings 201 and 301 are set. The inner rings are turned 180 degrees whereby they are diametrically set with respect to the outer rings 101 and 104. The extension 418,118 of the outer rings are now facing the narrowed portions 213,313 of the inner rings and the extensions 218,318 of the inner rings are now facing the narrowed portions 413,113 of the outer rings. The inner faces 105,205,305 and 405 are now forming a common uninterrupted radial inner face, which can be radially expanded. The inner rings are closing the gaps of the inner faces 105 and 405 of the outer rings and the outer rings are closing the gaps of the inner faces 205,305 of the inner rings. The rings 101,201,301 and 401 can be fastened axially behind each other around a common axis through centre point 3. That can be done by inserting rivetts into bores 15 and 16 or by leaving said bores away and do a spotwelding of the four rings at places 15 and 16. Any other fastening means may be used, when it is suitably applicable.

For setting the snap ring 41 over a cylindrical bar of a slightly bigger diameter than inner diameter with endnumerals 5 a punch or a Jig may be used to embrace the extensions 418,118 on the one side and 218,318 on the other side and pressing them together. Thereby the inner diameter of the snap ring assembly will widen. Please recognize, that the direction of the widening tool acts in this case in the opposite direction relatively to the common snap ring of the former art. When the extensions with endnumerals 18 are released, the snap ring assembly 41 will contract and fasten itself on the outer face of the body whereonto it is set.

The inside snap ring assembly 51 of FIGS. 5 and 6 consists of four rings 21 of FIG. 2 shown by referentials with enddigets 21, whereof rings 121 and 421 form the outer rings wherebetween the inner rings 221 and 321 are set. The inner rings are 180 degrees turned and thereby diametrically mounted with respect to the outer rings. Thereby the arms 132,432 of the outer rings are facing the gaps 230,330 of the inner rings and the arms 232,332 of the inner rings are facing the gaps 430,130 of the outer rings. The outer faces 127,227,327 and 427 of the inner rings and outer rings are now forming together a common radially uninterrupted outer face 57 around centre 4.

The assembly of the snap ring assembly of these figures into the cylindrical inner face of a hollow body may be done in the same way as the insertion of inside snap ring 21 of FIG. 2. The four rings of the snap ring assembly of FIGS. 5 and 6 may be fastened axially behind each other around a common axis through point 4 by rivetts in bores 35,36 or by spotwelding at places 35,36 or by any other suitable fastening means.

Instead of making the centric inner or outer faces cylindrical it is also possible to incline them to a taper relatively to the respective centric axis.

Figure 7:
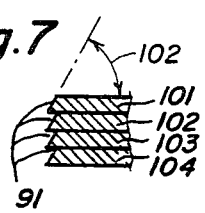
FIG. 7 and FIG. 8 show alternatives of inner- or outer-centric faces of respective rings in partial sectional views.

FIG. 7 shows such tapered centric outer faces 91 on the snap ring assembly of FIG. 5.

Figure 8:
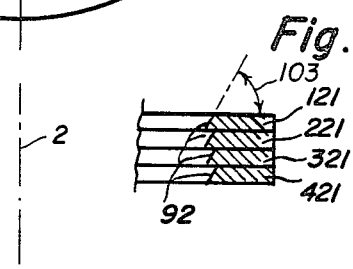

FIG. 8 shows such tapered centric inner faces 92 on the snap ring assembly of FIG. 3.

The feature of such centric tapered faces is, that the inside snap ring assembly of FIG. 7 then cuts slightly into the cylindrical face of the hollow body whereinto it is inserted. That supplies a strong ability to keep the axially set location also against axial thrust forces.

The similar capability of keeping a once set axial location also against axially directed thrust forces is also obtained by the snap ring of FIG. 8 because the tapered inner faces 92 are then cutting under the radial clamping force of the snap ring slightly into the cylindrical outer face of the bar whereonto they are set.

Another feature of the snap ring of FIGS. 1 or 3 of the invention can be, that the outer face 47 can remain within a bigger radius 19 around the eccentric axis 4. The mentioned bigger radius 19 has then the dimension of radius 6 around centric axis 3 plus the eccentricity between the centric and the eccentric axes 3 and 4.

The snap rings of the invention provide a number of features. For example, they can be singly set or aplurality of snap rings or of snap ring assemblies can be set axially behind each other. The inner faces of the outside snap ring assemblies of the invention may be grinded in unison for precise holding on the respective outer face of the body whereonto they are set. The outer faces of the inside snap ring assemblies of the invention may be grinded in unison for precise holding on the inner face of the hollow body whereinto they are set.

The lengths of the snap ring assemblies of the invention make strong radial width possible without axial deformaton, whereby the spanning force of the snap ring assemblies of the invention can be drastically increased over those of the former art.

As a result thereof the snap ring assemblies of the invention can have such great fastening forces, that the common annullar grooves which where common in or on bodies wherearound or whereinto the snap rings of the former art were set, can in many cases of application be spared by the invention. In addition a more precise axial setting is possible, because walls of slots or grooves are no more needed. Their expensivity and unaccuracy of the former art can thereby be prevented. The snap rings of the invention can thereby find applications where the snap rings of the former art failed.

The snap rings of the invention prevent the ugly configuration of the common snap rings of the former art and can be formed within the circles around the eccentric radii as for example is demonstrated by radius 19 in FIG. 3. That makes hurting of persons or of material less likely than it appeared with snap rings of the former art.

The snap ring assemblies of the invention can close the gaps which appeared when former art snap rings were used to fasten hoses on pipes. The escape of fluid from such hoses around pipes in former art snap ring applications is prevented by the invention.

And, finally, the snap rings can be standardized by the ISA, International standard association so, that single snap rings and snap ring assemblies of the invention can be made by the same Jigs. Modifications may be possible without leaving the scope of the invention. One of the features of the snap ring assembly of the invention is, for example, that the assembly opens radially by forcing the ends 218,318 and 118,418 together to reduce the distance of the ends between them. That can be done with a commercially available common punch, having a pair of forceps. The forceps of the punch then need a width of just the length of the snap ring assembly. Thereby the radial opening of the snap ring of FIGS. 3,4 is possible within the axial length of the snap ring assembly. In snap rings of the former art the punch to open the snap ring radially required an insertion of the punch or of the forceps axially from the end of the snap ring. Snap rings of the former art could, thus, not be assembled or disassembled, when no space was available axially of the end of the respective snap ring.

Snap rings of the former art in addition had merely substantially radially extending gaps. They thereby failed to close the ring in a radial extension at least at a small space. On contrary thereto the stiffly inclined gap of the snap ring of the invention closes the space in radial direction radially of the beginning of the gap, whereby the snap ring of the invention obtains an ability to bear in axial direction a member to be borne axially by the snap ring, in a full circle of full threehundredsixty degrees.

I claim:

1. A snap ring of partially symmetric configuration about an imaginatory medial face through centric and an eccentric axes,
   wherein one radius around one of said axes defines at least a portion of an outer face of said snap ring,
   wherein another radius around the other of said axes defines at least a portion of an inner face of said snap ring, and
   wherein a gap slots of said snapring radially while said gap is distanced from said imaginary medial face and set in an angle relatively to said medial face.

2. The ring of claim 1, wherein means are provided on said ring to give hold for a spanner to radially deform said ring against the radial forces of said ring.

3. The ring of claim 1 wherein said outer face is formed around said centric axis and is tapered relatively to said centric axis.

4. The ring of claim 1, wherein said inner face is formed around said centric axis and is tapered relatively to said centric axis.

5. The ring of claim 1, wherein the face around said eccentric axis remains within the defines of a bigger radius around said centric axis and wherein said bigger radius is defined by the said radius around said eccentric axis plus the eccentricity between said axes.

6. A snapring consisting of four substantially equal plane rings, wherein each ring has an inner face and an outer face with an eccentricity between said faces for forming a radially wider portion on the respective ring and a radially narrower portion on the respective ring, wherein said radially wider portion bears the main force of the radial capability to spann said ring in radial direction,
   wherein a slot is provided cutting said radially narrower portion for making a radial flexibility of said ring possible,
   wherein an imaginary face can be assumed through the middle of said wider and narrower portions, whereby said ring forms portions of symmetry around said imaginary face;
   wherein said slot extends normal or under an angle relatively to said imaginary face,
   wherein an extension of one arm of said ring extends along said slot to form the other wall of said slot,
   wherein the other arm of said ring ends on said slot,
   wherein said ring includes at least one connection portion for fastening of a plurality of rings axially behind each other,
   wherein said four rings consist of two inner rings and of two outer rings, wherein said inner rings are axially behind each other,
   wherein one of said outer rings attaches one of said inner rings and the other outer ring attaches the other of said inner rings,
   wherein said inner rings are oppositionally mounted respectively to said outer rings whereby said extensions of said inner rings face said slots of said outer rings,
   wherein said arm extensions extend radially beyond said slot; and
   wherein said rings are axially behind each other are kept together by connection means to form together said snap ring, whereby the inner rings are closing the slot areas of said outer rings and said outer rings are closing the slot areas of said inner rings for forming a radially allround inner face-set on said snap-ring while said snap ring may be radially expanded by pressing said extensions together by a respective jig for moving said snap ring over a cylindrical part to be fastened whereafter when said extensions are released from said pair of forceps, the said snap ring clamps radially inwardly to keep said part kept allround spanned by said inner faces of said rings under the radially inwardly directed spanning forces of said snap ring.

7. A snap ring consisting of four substantially equal plane rings, wherein each of said rings has an inner face and an outer face with an eccentricity between said faces for forming a radially wider portion on the respective ring and a radially narrower portion on the respective ring, whereby said radially wider portion bears the main force of radial capability to spann said ring in radial direction,
   wherein a slot is provided, cutting said narrower portion for making a radial flexibility of said ring possible,
   wherein an imaginary face can be assumed through the middles of said wider and narrower portions, whereby said ring forms portions of symmetry around said imaginary face,
   wherein said slot extends normal or under an angle relatively to said imaginary face,
   wherein an extension of one arm of said ring extends along said slot to form the other wall of said slot,
   wherein the other arm of said ring ends on said slot to form the first wall of said slot,
   wherein said ring includes at least one connection portion for fastening of plural rings axially behind each other around a common axis, wherein said four rings consist of two inner rings and two outer rings, wherein said inner ring are axially behind each other, wherein one of said outer rings attaches one of the inner rings and the other of said outer rings attaches the other of said inner rings,
   wherein said inner rings are oppositionally mounted respectively to said outer rings whereby said extensions of said inner rings face said slots of said outer rings,
   wherein said outer faces of said rings can be retracted radially inwardly by narrowing said slots,
   wherein said outer faces expand radially when the retraction is released, and
   wherein said outer faces are forming a common allround outer face able to fasten itself under the own radial expansion force within a hollow cylinder whereby the respective portions of the said inner rings are facing the slots of said outer rings and respective portions of said outer rings are facing the slots of said inner rings.

* * * * *